July 9, 1963
E. F. HIGGINS, JR ETAL
3,096,591
RADIO FREQUENCY LEVELING DEVICE
Filed June 29, 1960
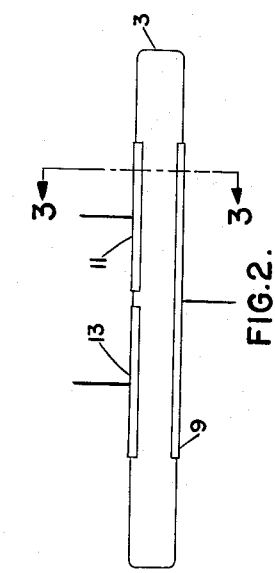
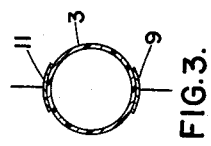
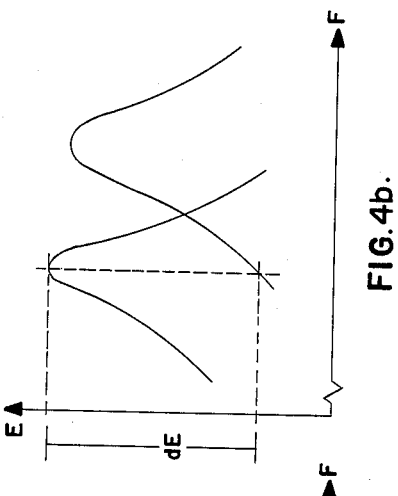
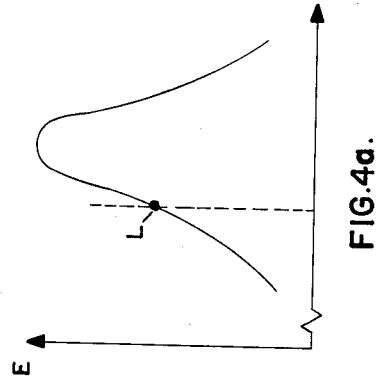
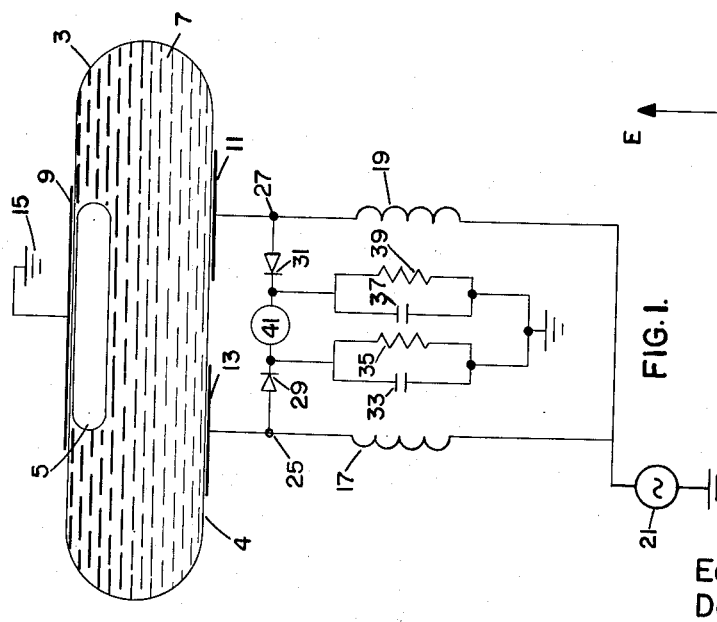
Edward F. Higgins, JR
Daniel H. Larson,
INVENTORS.
BY
S. J. Rotondi
A. P. Dupont
C. A. Phillips
ATTORNEYS.

United States Patent Office 3,096,591
Patented July 9, 1963

3,096,591
RADIO FREQUENCY LEVELING DEVICE
Edward F. Higgins, Jr., and Daniel H. Larson, Parsippany-Troy Hills Township, Morris County, N.J., assignors, by mesne assignments, to the United States of America as represented by the Secretary of the Army
Filed June 29, 1960, Ser. No. 39,750
2 Claims. (Cl. 33—206)

This invention relates to leveling devices, and more particularly to an R.F. capacitance operated leveling device.

There exists a general need for an extremely accurate device which will electrically indicate a level condition and be capable of indication at a distance from the measurement. This need is most particularly felt in the missile field because of the need to accurately level missile launching platforms and various other equipment.

In accordance with the invention a measurement device is provided in which the position of the bubble of a spirit level is sensed by electrical capacity. It has been found that by inserting in a capacitive circuit a portion of the level as a dielectric that an extremely sensitive indication of level is obtained, the indication being responsive to the extent that the bubble displaces liquid as the dielectric. Methyl alcohol, which has a relatively high dielectric constant of approximately 30, works well to provide a sensitive indication. Even so, with dimensions approximating those of the usual level liquid column and proportional size capacitor plates, changes in capacity on the order of only one micromicrofarad with a change from bubble full under to full out from the capacitor plates is obtained. To overcome the problem presented in the measurement of such a small quantity, a special capacitive circuit was devised in which two capacitors are differentially coupled by the level. Further, a measurement circuit was developed to register the difference in capacity appearing in the capacitive circuit which requires no amplification. It employs a radio frequency signal source, which may be a simple oscillator, and two inductors which are connected, respectively, between each capacitor and the source. The inductors are chosen to produce near resonance at the source frequency and thus operate on the steep portion of the characteristic resonance curve. Capacitor output voltages are rectified and compared in a conventional readout device such as galvanometer.

This invention will be more fully understood from the following detailed description and drawings, in which
FIGURE 1 is a diagrammatic-schematic illustration of the device;
FIGURE 2 is an elevation view of a spirit level constructed in accordance with the invention;
FIGURE 3 shows an enlarged cross section view along lines 3—3 of FIGURE 2; and
FIGURE 4a shows a plot of the electrical response of the embodiment shown in FIGURE 1 when the device is at level position.
FIGURE 4b shows a plot of the electrical response of the embodiment shown in FIGURE 1 when the device is at the off-level condition.

Referring to FIGURE 1, there is shown a spirit level 3 with a gaseous bubble 5 floating in a dielectric liquid 7. The case or shell 4 of spirit level 3, as illustrated in FIGURES 2 and 3, is constructed of an insulating material upon which is fastened, as by spraying and baking, electrode plates 9, 11 and 13. Electrode plate 9 is on the opposite side of and insulated from plates 11 and 13. Plate 9 is connected to ground 15, and forms capacitors with plates 11 and 13 respectively. Plates 11 and 13, and thus the two capacitors of the device, are spaced apart not greater than the length of the bubble. These plates are connected through equal value inductors 17 and 19 to a radio frequency (R.F.) signal source 21. The signal from source 21 appears between plates 9 and 11 and between plates 9 and 13 and thus across dielectric liquid 7, and bubble 5. When the bubble 5 is equally distributed between the plates, the signal level at points 25 and 27 will be equal, since the capacitive reactances between plates 9 and 11 and 9 and 13 are equal. This signal is rectified by rectifiers 29 and 31, filtered by capacitor-resistor filters 33–35 and 37–39, and impressed on galvanometer 41.

In operation, a shift in attitude from level will move bubble 5 and thus unbalance the reactances of the two paths due to the change in the dielectric between the plates. This causes a change in voltage at points 25 and 27 and this change is reflected as a change in voltage across potential indicating device 41, which registers the imbalance. Thus a deviation in level is indicated. FIGURE 4 illustrates the voltage-frequency characteristics of the outputs appearing across capacitor plates 9—11 and 9—13 with a change in bubble position. Near resonant circuits formed, respectively, by the combination of inductor 17 and the capacitor formed by plates 9 and 13, and by inductor 19 and the capacitor formed by plates 9 and 11 are tuned by the choice of inductors so that at the level position the circuits operate at the point (FIGURE 4a) on the resonance curve where the slope is the greatest. For the off-level condition, one resonant circuit becomes more inductive while the other circuit becomes more capacitive. Thus for a fixed frequency, a difference of voltage $dE$ is seen, as shown in FIGURE 4b. This voltage difference can be read as an indication of level, which indication may, of course, be remote from the level itself.

It will be appreciated that the above device can assume many forms, therefore it is not desired to limit the invention to the form described above.

We claim:
1. A leveling system comprising: a spirit level having a gaseous bubble floating in a dielectric liquid; a first common electrode attached to one side of said level; a second electrode and a third electrode attached to the opposite side of said level, said common electrode and said second electrode forming a first capacitor, said common electrode and said third electrode forming a second capacitor, the electrodes of said capacitors being differentially dielectrically coupled by the bubble of said spirit level wherein a movement of said bubble in a first direction produces an increase in the capacitance of said first capacitor and a decrease in the capacitance of said second capacitor and a movement of said bubble in the opposite direction produces a decrease in the capacitance of said first capacitor and an increase in the capacitance of said second capacitor; detection means coupled to said capacitor to detect the difference in capacitance of said capacitors, said detection means having a radio frequency signal source, first and second inductors each having a reactance of a magnitude approximately equal to that of one of said capacitors at the source frequency, means for connecting said first inductor and said first capacitor in series with said radio frequency signal source, means for connecting said second inductor and said second capacitor in series with said radio frequency signal source and in parallel with said first inductor and said first capacitor, a measuring circuit, having one end connected to said first capacitor and said first inductor, and the other end to said second capacitor and said second inductor.

2. The device as set forth in claim 1 wherein said measuring circuit comprises a first rectifier, a first filter circuit, a galvanometer, a second filter circuit and a second rectifier connected in that respective sequence between said first capacitor and said first inductor and said second capacitor and said second inductor.

References Cited in the file of this patent

UNITED STATES PATENTS

| | | |
|---|---|---|
| 2,252,727 | Pepper | Aug. 19, 1941 |
| 2,592,941 | Moore | Apr. 15, 1952 |
| 2,866,146 | Rodriguez | Dec. 23, 1958 |